March 29, 1932.  E. MÜNZER  1,851,401

CALCULATING MACHINE

Filed Dec. 21, 1928

Inventor:
E. Münzer
By: Marks & Clerk
Attys.

Patented Mar. 29, 1932

1,851,401

UNITED STATES PATENT OFFICE

ERICH MÜNZER, OF BERLIN, GERMANY, ASSIGNOR TO FIRMA TASMA-ADDIER-MASCHINEN G. M. B. H., OF BERLIN, GERMANY, A JOINT-STOCK COMPANY OF GERMANY

CALCULATING MACHINE

Application filed December 21, 1928, Serial No. 327,688, and in Germany January 10, 1928.

This invention relates to an operating device for the operating mechanism of calculating machines, especially adding machines, and is designed to enable the counter to be brought into or out of engagement with the differential mechanism or the like and to enable the said counter to be set for either addition or subtraction and to be converted from one to the other.

According to the operating device forming the subject of the invention, the wheels constituting the counter are carried from one member of a quadrangular link mechanism, so that according to the operation or setting of the said member, the counter can be moved from the adding to the subtracting position, or vice versa, while at the same time it is rendered possible to couple and uncouple the said counter to and from the differential member.

Figure 1:
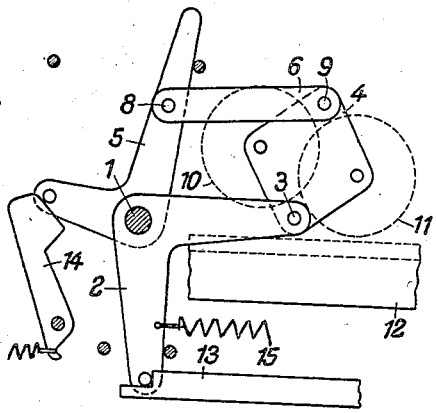
Figure 2:
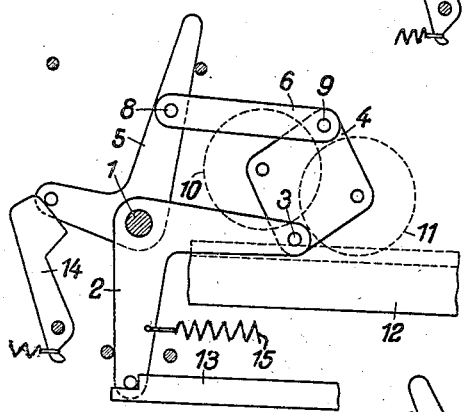
Figure 3:
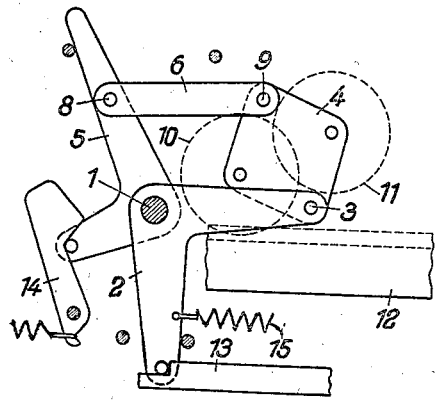

In order that the invention may be clearly understood it will now be described with reference to the accompanying drawings, which are given by way of example of one constructional embodiment, and in which; Figures 1, 2 and 3 are diagrammatic views of the invention showing the parts in three different positions of adjustment.

1 is an axle upon which are mounted bell crank levers 2 coming on each side of a bank of counter wheels. These bell crank levers form a bell crank lever frame mounted upon the axle 1.

Upon the aforesaid axle 1 are also mounted so that they can oscillate freely bell crank levers 5, which are also located on both sides of the bank of counter wheels, in this way forming also a bell crank frame.

The upper arm of one of the bell crank levers 5 may also serve as an operating handle.

To the bell crank levers 5 are connected links 6, which extend parallel to the approximately horizontal arms of the bell crank levers 2.

The ends of the links 6 and of the horizontal arms of the bell crank levers 2 are connected together by link plates 4, in such a way that the substantially vertical frames of the bell crank levers 5, the links 6, the plates 4 and the substantially horizontal arms of the bell crank levers 2 constitute a parallel link mechanism on each side of the bank of counter wheels.

Symmetrically located with respect to the pivotal points 3 and 9 are the banks of counter-wheels 10 and 11 meshing with one another and constituting the counter, one of the banks also being provided with a group of figure drums.

In Figure 1 the parts are shown in the normal position that is to say, the position in which the two wheels 10 and 11 are out of engagement with the rack bar of the counting mechanism. According to this position the manually operable lever 5 is in its right hand position. In Figure 3 the bell crank lever 5 is shown in its left hand position, the lever 2 remaining in the same position as that shown in Figure 1. With this adjustment the member 4 is tilted to such position that the wheel 10 is in mesh with the rack 12 while the wheel 11 is out of mesh. During the adjustment from the position shown in Figure 1 to that shown in Figure 3, the members 5 and 4 swing about the points 1 and 3. In the position shown in Figure 2, the hand lever 5 is swung to the right, to a position corresponding to that shown in Figure 1, while the lever 2 is moved to the left by a leftward displacement of the member 13. During this movement the several members 2, 4, 5 and 6 of the quadrangular link mechanism swing about the two points 1 and 8 and the wheel 11 is brought into mesh with the rack 12 while the wheel 10 is raised therefrom.

14 is a locking pawl which holds the quadrangular link mechanism in the position into which it is set (either for addition or for subtraction); 15 is a spring which holds the system in the inoperative position (that is out of engagement with the driving means of the differential mechanism) until a rod 13 operated from the driving means causes the oscillation of the bell crank lever 2 against the stress of the spring 15.

What I claim and desire to secure by Letters Patent of the United States of America is:—

1. An operating device for the counter mechanism of calculating machines especially for adding machines comprising quadrangular link mechanisms, two of the link members of each mechanism being mounted to oscillate independently about a fixed axis, two intermeshing banks of counter wheels carried by another of the link members and located symmetrically relatively to the last mentioned member, drive means, one of the first mentioned link members being adapted to be operated by hand and the other of the first mentioned link members being adapted to be operated from the operating mechanism of the machine in such a way that by the oscillation of one member by the hand the preliminary setting for addition or subtraction is effected while by the oscillation of the other from the driving means the engagement of the counter mechanism with the driving means of the differential mechanism is effected.

2. In a calculating machine for performing addition or subtraction a fixed axle, link lever mechanisms the corresponding elements of which carry between them symmetrically disposed two banks of interengaging counter wheels, means for oscillating the link mechanisms in order to bring one or other of the banks of wheels into near proximity with the differential bars of the machine, spring means for holding the link mechanisms with one or other of the banks at a short distance from the differential bars and means for overcoming the stress of the spring in order to bring one or other of the banks into engagement with the differential bars for the purposes set forth.

In witness whereof I affix my signature.

ERICH MÜNZER.